United States Patent
Pridham et al.

(10) Patent No.: US 6,320,118 B1
(45) Date of Patent: Nov. 20, 2001

(54) ADHESIVELY BONDED JOINTS IN CARBON FIBRE COMPOSITE STRUCTURES

(75) Inventors: Barry J Pridham; Roger P Duffy; Christopher C. R. Jones, all of Preston (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/397,867

(22) Filed: Sep. 17, 1999

Related U.S. Application Data

(63) Continuation of application No. PCT/GB99/01032, filed on Apr. 1, 1999.

(30) Foreign Application Priority Data

Apr. 4, 1998 (GB) .................................................. 9807198

(51) Int. Cl.$^7$ .................................................. H02G 13/00
(52) U.S. Cl. ........................ 174/2; 361/216; 361/218; 244/1 A
(58) Field of Search .................. 174/2, 84 R; 244/1 A, 244/131, 133; 361/216, 218

(56) References Cited

U.S. PATENT DOCUMENTS

| | | | |
|---|---|---|---|
| 3,347,978 | 10/1967 | Simon et al. | 174/84 |
| 4,479,163 * | 10/1984 | Bannick, Jr. et al. | 361/216 |
| 4,556,591 | 12/1985 | Bannink, Jr. | 428/43 |
| 4,891,732 * | 1/1990 | Jones | 361/218 |
| 5,127,601 * | 7/1992 | Schroeder | 224/1 A |
| 5,176,852 * | 1/1993 | Kondo et al. | 252/510 |
| 5,461,534 * | 10/1995 | Gondot et al. | 361/218 |
| 5,613,862 | 3/1997 | Naylor | 439/91 |
| 5,686,703 | 11/1997 | Yamaguchi | 174/259 |
| 5,698,316 * | 12/1997 | Kuras et al. | 428/344 |
| 5,845,872 * | 12/1998 | Pridham et al. | 244/1 A |

FOREIGN PATENT DOCUMENTS

| | | |
|---|---|---|
| 36 06464 | 9/1987 | (DE). |
| 0 685 389 | 12/1995 | (EP). |
| 1 478 919 | 7/1977 | (GB). |
| WO 92/09992 | 6/1992 | (WO). |

* cited by examiner

Primary Examiner—Dean A. Reichard
Assistant Examiner—W. David Walkenhorst
(74) Attorney, Agent, or Firm—Nixon & Vanderhye P.C.

(57) ABSTRACT

A structural joint for the transmission and control of high current flows in a carbon fiber or carbon fiber hybrid composite structure, said joint including

- at least two composite structures comprising a multiplicity of resin bonded carbon fiber plies,
- an adhesive applied there between and capable of conducting high currents
- said adhesive comprising a conductive carrier film comprising carbon fibers,
- wherein the electrical conductivity of the adhesive is comparable with that of the adjacent composite structures.

14 Claims, 1 Drawing Sheet

ADHESIVELY BONDED JOINTS IN CARBON FIBRE COMPOSITE STRUCTURES

This is a continuation of PCT application No. PCT/GB99/01032, filed Apr. 1, 1999, the entire content of which is hereby incorporated by reference in this application.

BACKGROUND OF THE INVENTION

1. Field of the Invention

This invention relates to adhesively bonded joints in carbon fibre composite structures or hybrids thereof.

Carbon fibre composites or hybrids thereof comprising one or more laminates or plies are being used increasingly for aircraft structures in place of the aluminum or metallic compounds formerly used. Although carbon fibre composite structures are generally stronger and stiffer than their metallic counterparts, nevertheless they lack the lightning strike tolerance of the metallic components.

2. Discussion of Prior Art

A lightning strike to an aircraft causes a high electric current, which may typically be of the order of a hundred thousand amps, to flow through the aircraft frame. In a carbon fibre composite structure, the carbon fibre plies act as very high resistance conductors and the resin in the composite acts as a highly capacitive dielectric so that lightning striking carbon fibre composite results in an increasing potential difference across the ply structure but no readily available electrically conductive path for discharging the current. The current therefore tends to concentrate at the structural joints making them particularly vulnerable to damage.

Methods of joining carbon fibre composites using metal fasteners are known, and indeed our UK patent application 9411006.1 describes the problems caused by lightning strike associated with the use of metal fasteners in composite structures and discloses means to overcome these problems.

Often it is preferable to make permanent joints in structural members by adhesively bonding carbon fibre composites. The use of adhesives in these joints can lead to failure when lightning strikes the airframe because known adhesives have very poor conductivity and cannot safely transfer lightning current.

Lightning current flowing in an airframe can produce voltage stresses across adhesively bonded joints. If the stresses exceed the joint's dielectric strength, the insulation will break down. This may lead to arcing and sparking which can cause extensive damage to the joint and explosive fuel ignition if in contact with fuel or fuel vapour.

For the above reasons critical joints in primary structure likely to be subjected to a lightning strike are generally not adhesively bonded. Where bonded joints are at risk of lightning strike damage, one known approach is to protect the joint by additionally installing fasteners usually in the form of solid metal rivets. Such protection of joints from lightning strike is discussed in Aircraft Lightning Protection Handbook by F. A. Fisher, J. A. Plumer, R. A. Perala DOT/FAA/CT-89/22. This solution is unsatisfactory when used near fuel tanks because the lightning current tends to concentrate at the highly conductive fasteners and is unable to dissipate at a fast enough rate so that arcing and dangerous sparks are likely to occur, carrying the high risk of injecting sparks, molten material and hot gases into the fuel tank. Additionally even in areas away from fuel tanks, the installation of a large number of fasteners compromises the benefits of the adhesive bonding by adding time to the manufacturing process and weight to the airframe.

SUMMARY OF THE INVENTION

The present invention seeks to overcome the problems of high electric currents flowing across adhesively bonded joints in carbon fibre composite structures, including those close to fuel, without compromising structural integrity.

According to the invention in one aspect thereof, there is provided a structural joint for the transmission and control of high current flows in a carbon fibre or carbon fibre hybrid composite structure, said joint comprising:

at least two composite structures comprising a multiplicity of resin bonded carbon fibre plies;

an adhesive applied there between and capable of conducting high currents through and away from the joint;

said adhesive including a conductive carrier film comprising carbon fibres, wherein the adhesive has an electrical conductivity comparable with that of the adjacent composite structures.

Preferably the carbon fibres in the adhesive are in the form of a lightweight scrim.

Alternatively the carbon fibres in the adhesive may be in the form of chopped fibres.

An electrically conductive layer may be incorporated in or be applied to an outer surface of at least one of said composite structures. This electrically conductive layer is preferably a copper strip. Conductive fasteners may be in contact with the electrically conductive layer.

According to the invention in a further aspect thereof an adhesive for bonding carbon fibre or carbon fibre hybrid composite structures and capable of conducting high current comprises a conductive carrier film comprising carbon fibres.

Advantageously, the electrical conductivity of the adhesive is comparable with that of the carbon fibre or carbon fibre hybrid composite structures to be bonded.

The carbon fibres in the adhesive are preferably in the form of a lightweight scrim. Alternatively the carbon fibres may be in the form of chopped fibres.

According to the invention in a further aspect thereof a method of forming a structural joint includes the steps of providing two or more carbon fibre or carbon fibre hybrid composite structures, applying an adhesive therebetween and curing the joint, wherein the adhesive comprises a conductive carrier film including carbon fibres and has an electrical conductivity comparable with that of the adjacent composite structures. Preferably, the adhesive comprises few, if any, metallic fillers.

Structural joints according to the present invention allow composite structures to be adhesively bonded together without the need for mechanical fasteners whilst displaying similar strength characteristics as traditionally fastened joints, making them ideal for applications requiring high performance, lightning resistant, joints.

We have found that structural joints according to the present invention having a conductivity comparable to that of the carbon fibre composite are advantageous in aircraft lightning protection arrangements, particularly in bonding aircraft skin panels to an aircraft substructure, which may for example be the wall of the fuel tank, where the panels and substructure are made from carbon fibre composites.

BRIEF DESCRIPTION OF THE DRAWINGS

Embodiments of the invention will now be described by way of example only and with reference to the accompanying drawings in which.

DETAILED DISCUSSION OF PREFERRED EMBODIMENTS

Figure 1:
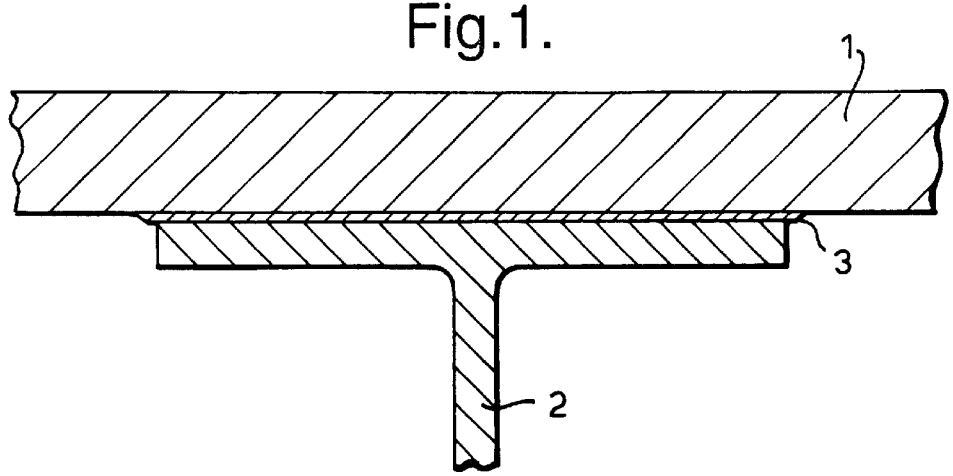
FIG. 1 is a cross-section through an adhesively bonded joint in a carbon fibre composite structure.

Referring to FIG. 1, a structural adhesive 3 is shown securing a skin panel 1 of an aircraft structure to an inner substructure 2 comprising the wall of a fuel tank. Both the skin panel 1 and the substructure 2 are made of carbon fibre composite material of low weight and high strength, having a percentage of 50–60% carbon fibre in the composite material. The adhesive 3 is a film adhesive containing a conductive carbon fibre carrier film, where the carbon fibres may typically be in the form of a lightweight scrim or chopped fibres. The adhesive 3 has an electrical conductivity comparable to that of the composites 1 and 2. Ideally, the percentage of carbon fibre in the adhesive 3 is typically 10–25%, and the adhesive 3 comprises little or no metallic fillers.

Figure 2:
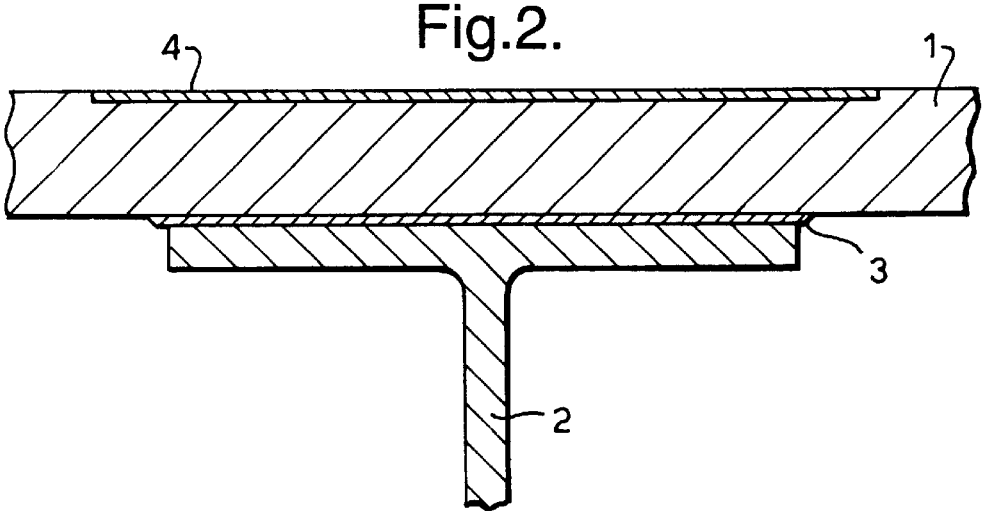
FIG. 2 is a cross-section through an alternative form of adhesively bonded joint in a carbon fibre composite structure.

An alternative to the above structural arrangement is shown in FIG. 2, in which reference numerals identical to those used in FIG. 1 have been employed to indicate similar parts. Only the differences will be described.

In the joint shown in FIG. 2, a thin copper strip 4 is incorporated in the outside surface of the skin 1 and runs the full length of the joint. The copper strip 4 is in electrical contact with the carbon fibre composite structure and further enhances the lightning tolerance of the joint by providing a preferential low resistance path for the lightning current.

Figure 3:
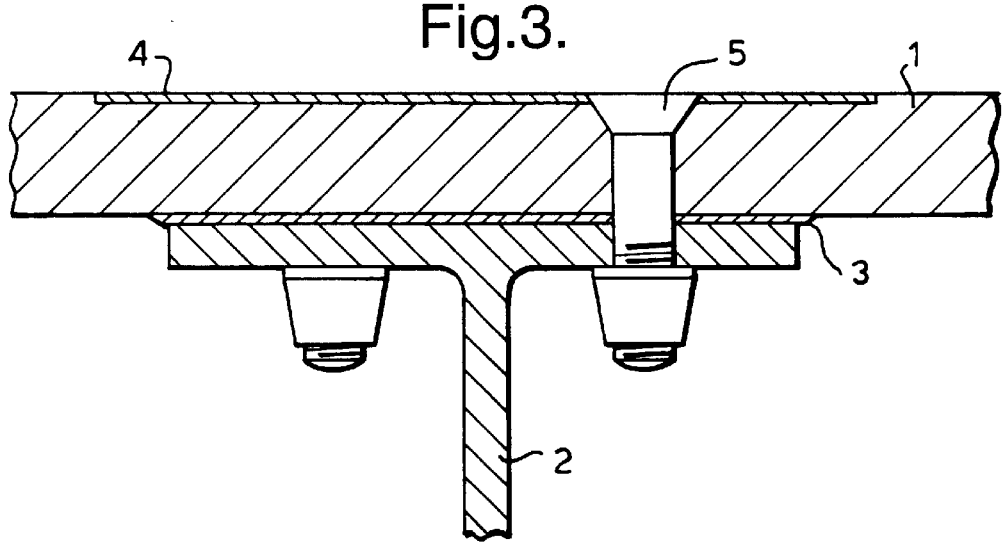
FIG. 3 is a cross-section through a further form of adhesively bonded joint in a carbon fibre composite structure.

FIG. 3 shows a further embodiment, again using identical reference numerals to indicate similar parts to those shown in FIGS. 1 and 2. FIG. 3 illustrates a structural arrangement having mechanical fasteners 5 placed across a joint where the mechanical fasteners 5 are in contact with the copper strip 4. This embodiment further enhances the lightning tolerance of the joint by reducing the voltage stress across the joint.

It will be recognised that structural joints according to the invention may be used in applications other than aircraft bodies, for example they may be used in the structures of launch vehicles and missiles, and indeed any application where the joints may be exposed to a lightning strike or other high voltage.

What is claimed is:

1. A structural joint for the transmission and control of high current flows in a joint between at least two carbon fibre or carbon fibre hybrid composite structures, said joint comprising:
    said at least two composite structures comprising a multiplicity of resin bonded carbon fibre plies,
    an adhesive applied to said joint between said composite structures and capable of conducting high currents through and away from the joint,
    said adhesive comprising a conductive carrier film comprising carbon fibres,
    wherein the electrical conductivity of the adhesive is comparable with that of the adjacent composite structures,
    and wherein the adhesive, once cured, acts to adhesively bond the two composite structures together to form a load-bearing structural joint.

2. A structural joint according to claim 1 wherein the carbon fibres in the adhesive are in the form of a lightweight scrim.

3. A structural joint according to claim 1 wherein the carbon fibres in the adhesive are in the form of chopped fibres.

4. A structural joint according to claim 1 wherein an electrically conductive layer is incorporated in or is applied to an outer surface of at least one of said composite structures.

5. A structural joint according to claim 4 wherein the electrically conductive layer is a copper strip.

6. A structural joint according to claim 4 wherein conductive fasteners are in contact with the electrically conductive layer.

7. A structural joint for the transmission and control of high current flows in a carbon fibre or carbon fibre hybrid composite structure, said joint comprising:
    at least two composite structures comprising a multiplicity of resin bonded carbon fibre plies,
    an adhesive applied there between and capable of conducting high currents through and away from the joint,
    said adhesive comprising a conductive carrier film comprising carbon fibres,
    wherein the electrical conductivity of the adhesive is comparable with that of the adjacent composite structures, wherein an electrically conductive layer is incorporated in or is applied to an outer surface of at least one of said composite structures.

8. A structural joint according to claim 7 wherein the electrically conductive layer is a copper strip.

9. A structural joint according to claim 7 wherein conductive fasteners are in contact with the electrically conductive layer.

10. An adhesive for bonding carbon fibre or carbon fibre hybrid composite structures wherein the adhesive conducts high current, comprises a conductive carrier film comprising carbon fibres, has an electrical conductivity comparable with that of the adjacent carbon fibre or carbon fibre hybrid composite structures, and, when cured, creates a high strength bond between the composite structures which is of sufficient strength to act as a load-bearing structural joint.

11. An adhesive according to claim 10 wherein the carbon fibres therein are in the form of a lightweight scrim.

12. An adhesive according to claim 10 wherein the carbon fibres therein are in the form of chopped fibres.

13. An adhesive according to claim 10 wherein the electrical conductivity of the adhesive is comparable with that of the adjacent carbon fibre or carbon fibre hybrid composite structures.

14. A method of forming a structural joint including the steps of
    providing two or more carbon fibre or carbon fibre hybrid composite structures,
    applying an adhesive between said structures forming a joint, and
    curing the joint to form a load-bearing structural joint, wherein the adhesive conducts high currents through and away from the joint, the adhesive comprising a conductive carrier film comprising carbon fibres and has an electrical conductivity comparable with that of the adjacent composite structures.

* * * * *